INVENTORS.
MAURICE H. ARTAUD
RONALD W. JOHNSON
PRATIVADI I. SAMPATH

INVENTORS.
MAURICE H. ARTAUD
RONALD W. JOHNSON
PRATIVADI I. SAMPATH
BY
*John R Duncan*
ATTORNEY

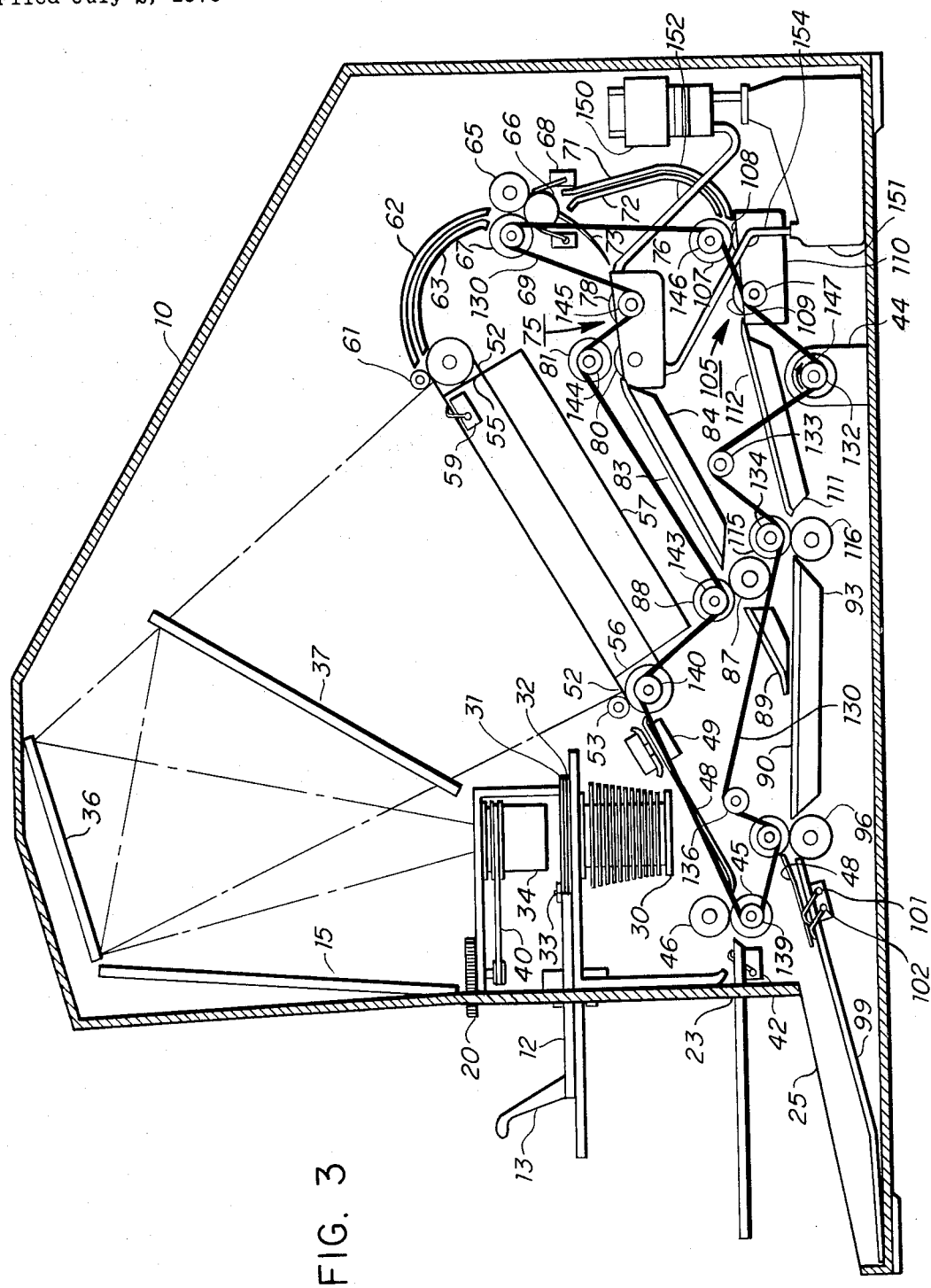

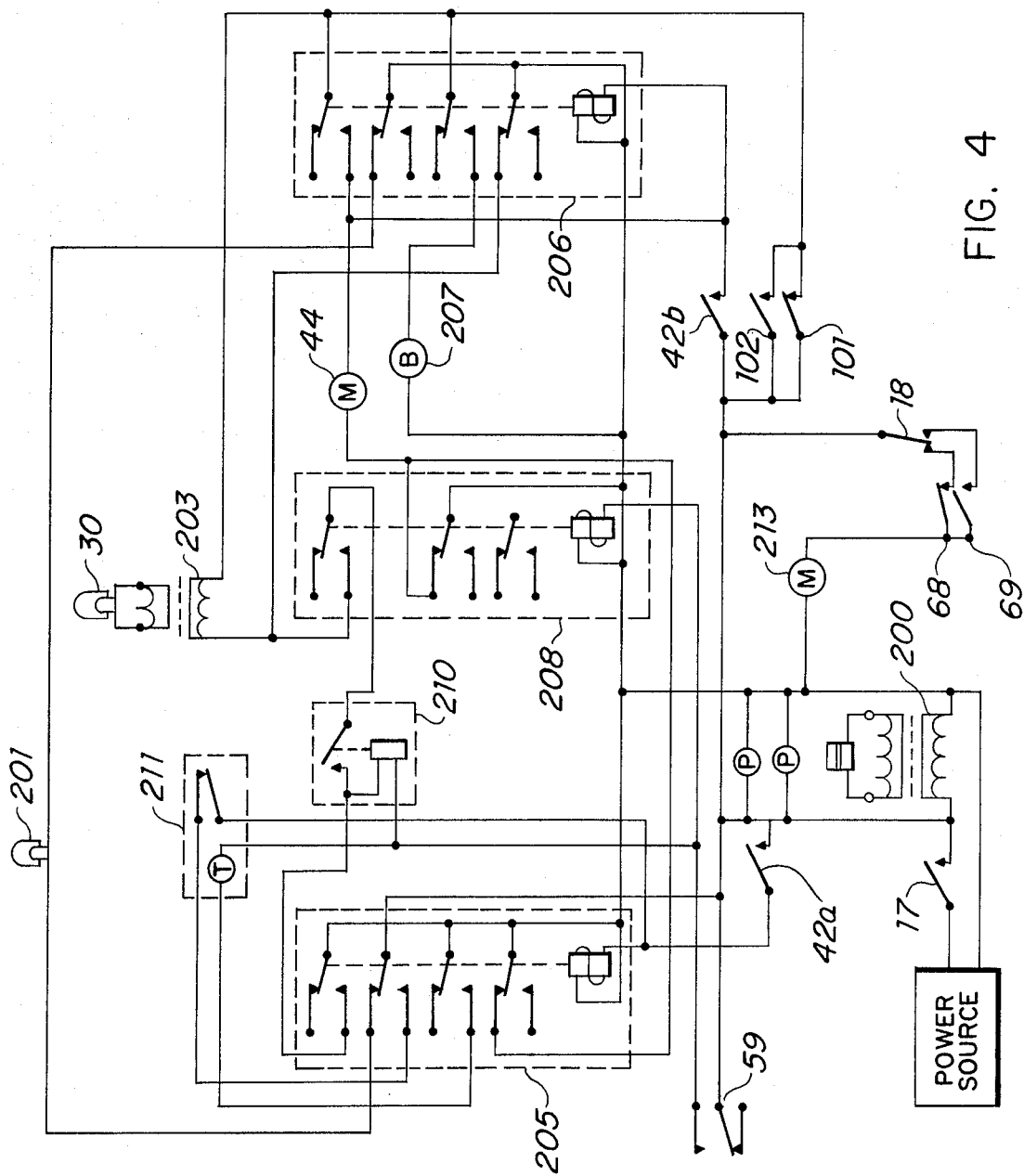

United States Patent Office 3,674,354
Patented July 4, 1972

3,674,354
MICROFILM VIEWER-PRINTER
Maurice H. Aratud, Spring Valley, Ronald W. Johnson, Chula Vista, and Prativadi I. Sampath, La Jolla, Calif., assignors to Stromberg Datagraphix, Inc., San Diego, Calif.
Filed July 2, 1970, Ser. No. 51,882
Int. Cl. G03g *15/00, 15/10*
U.S. Cl. 355—5
5 Claims

ABSTRACT OF THE DISCLOSURE

A combined microfilm viewing device and hard-copy printer is disclosed. Hard copies are made on paper from selected microfilm images by an electrostatic process. Two parallel image development devices are provided. Thus, the operator may conveniently select either a negative or a positive paper copy of the microfilm images. Alternatively, the development devices may be arranged to give the operator a choice of two image colors. In a preferred embodiment, a beam-splitter arrangement is provided to simultaneously direct part of the light passing through the microfilm to a viewing screen and part to the electrostatic paper exposure station.

BACKGROUND OF THE INVENTION

Microfilm systems are coming into widespread use in record retention arrangements computer output microfilming and rapid access information storage and retrieval. Essential to the effectiveness of a microfilm system is the equipment for viewing the microimages and for printing hard copies on paper.

Most present microfilm viewers do not have hard copy printing capability. An operator requiring a copy must find the desired frame using a viewer, then take the microfilm to a printer to have the paper copy made. Such an inconvenient arrangement discourages full utilization of the microfilm.

Recently, combination microfilm viewer-printers have been introduced. These devices are often complex and cumbersome. Generally, a moving mirror is used to selectively direct the microfilm image either to a viewing screen or to a copying station. The moving mirror is difficult to keep in alignment, since if it does not return to exactly the same position when moved, the image on the viewing screen and/or copy will be degraded. Also, the image cannot be viewed during the copying operation.

Microfilm may contain either positive or negative images. That is, the image may appear as black lines on a clear background (as in most silver-halide microfilm) or as clear lines on an opaque background (as in most vesicular microfilm). Desirably, however, the paper copies produced from the microfilm will have positive images (black on white). Most printers will give positive paper copies from one type of microfilm. Generally, it is difficult or impossible to obtain positive copies of equal quality from both positive and negative microfilm without substantially replacing the entire copying mechanism. This is a severe limitation on the system capability.

In some instances, it is desirable to overprint two microfilm images on a single paper copy, in two colors. For example, it may be desired to print both black and red lines on financial charts from microfilm. Present viewer/printers are incapable of such printing without substantial modification of the copying mechanism between exposures. Also, many copying materials are incapable of providing two-color, multiple-exposure images.

Thus, there is a continuing need for microfilm viewer-printers capable of handling the varying needs of modern microfilm systems.

SUMMARY OF THE INVENTION

It is, therefore, an object of this invention to provide a microfilm viewer-printer overcoming the above-noted problems.

Another object is to provide a microfilm viewer-printer capable of producing either positive or negative hard copies from either positive or negative microfilm images.

Still another object is to provide a microfilm viewer-printer which is capable of selectively producing hard-copy images in either of two colors.

A further object is to provide a microfilm viewer-printer having an optical system of improved simplicity and reliability.

The above objects, and others, are accomplished in accordance with this invention by a microfilm viewer-printer utilizing an improved electrostatic hard-copy printing mechanism and an improved optical system. Hard copies on electrostatic imaging materials are produced upon demand from micro-images being viewed on a viewing screen. A fixed optical system, including a beam-splitter to direct part of the light to a viewing screen and part to the copying station, is preferably provided. While conventional electrophotographic copying processes, generally using paper coated with zinc oxide particles dispensed in a binder are especially economical and convenient, any other process in which exposure to a pattern of actinic radiation results in an electrostatic latent image may be used, if desired. Other typical processes include those in which a latent electrostatic image is transferred from an exposed photoconductor to a paper sheet and that disclosed in U.S. Pat. 3,502,408. The following description of a preferred embodiment includes the preferred electrophotographic materials.

The copying station includes at least two electrostatic development devices. After the paper is electrostatically charged and exposed to a light image, it is selectively directed to either a positive or a negative development device. Thus, copies may be made having the same or opposite sign as the microfilm image being copied. Alternatively, the two (or more, if desired) development devices may each apply toner of a different color. Thus, for example, either red or black images may be produced. Or, a sheet of paper may be exposed to a first image and developed in one color, then it may be re-exposed to a different image and overprinted in another color.

This microfilm viewer-printer is extremely simple and reliable, with a minimum of controls and adjustments for the operator.

BRIEF DESCRIPTION OF THE DRAWING

Details of the invention and a preferred embodiment thereof, will be further understood upon reference to the drawing, wherein:

FIG. 3 is a schematic sectional view taken from just inside the right side of the viewer-printer;
and
FIG. 4 is an electrical circuit diagram of the viewer-printer control and operating system.

Referring now to FIG. 1 there is seen a microfilm viewer-printer contained within an overall housing 10. In the embodiment shown, a microfiche is placed in holder 12 and inserted into the viewer. A desired image is located at the optical projection station by moving handle 13 in two dimensions while watching the images projected on viewing screen 15. Of course, micro-images in roll film or aperture card form may be viewed merely by replacing holder 12 with an appropriate, conventional, film or card handling device.

Figure 1:
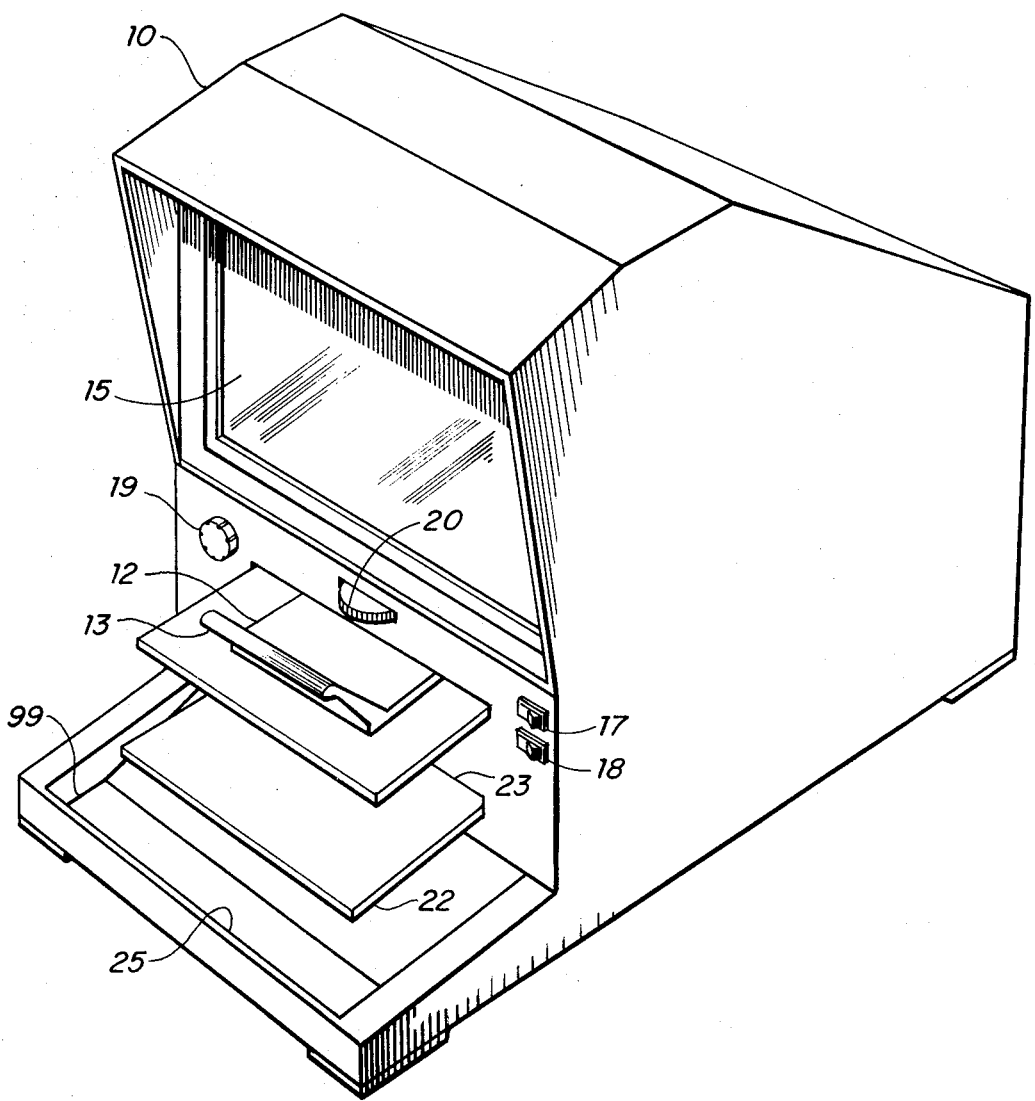
FIG. 1 is an isometric view of the viewer-printer.

A conventional electrical switch 17 is provided for turning the viewer lamp on and off. A mole switch 18, is provided for selecting the desired development process, as is described in detail below. A timer knob 19 is provided for varying the exposure time to compensate for differing micro-image density and system photosensitivity. For example, either a positive or negative development mode might be selected by switch 18.

A knob 20 is provided for focusing the projection lens. The optical system is designed so that when a sharp image is seen on screen 15, a similarly sharp image will be projected onto the hard-copy printing platen.

When a hard-copy of an image seen on screen 15 is desired, switch 18 is moved to the selected development mode position, then a sheet of electrostatic paper is placed on shelf 22 and inserted into slot 23. The sheet is drawn into the device, exposed, developed and returned into tray 25 fully processed and ready for use.

Figure 2:
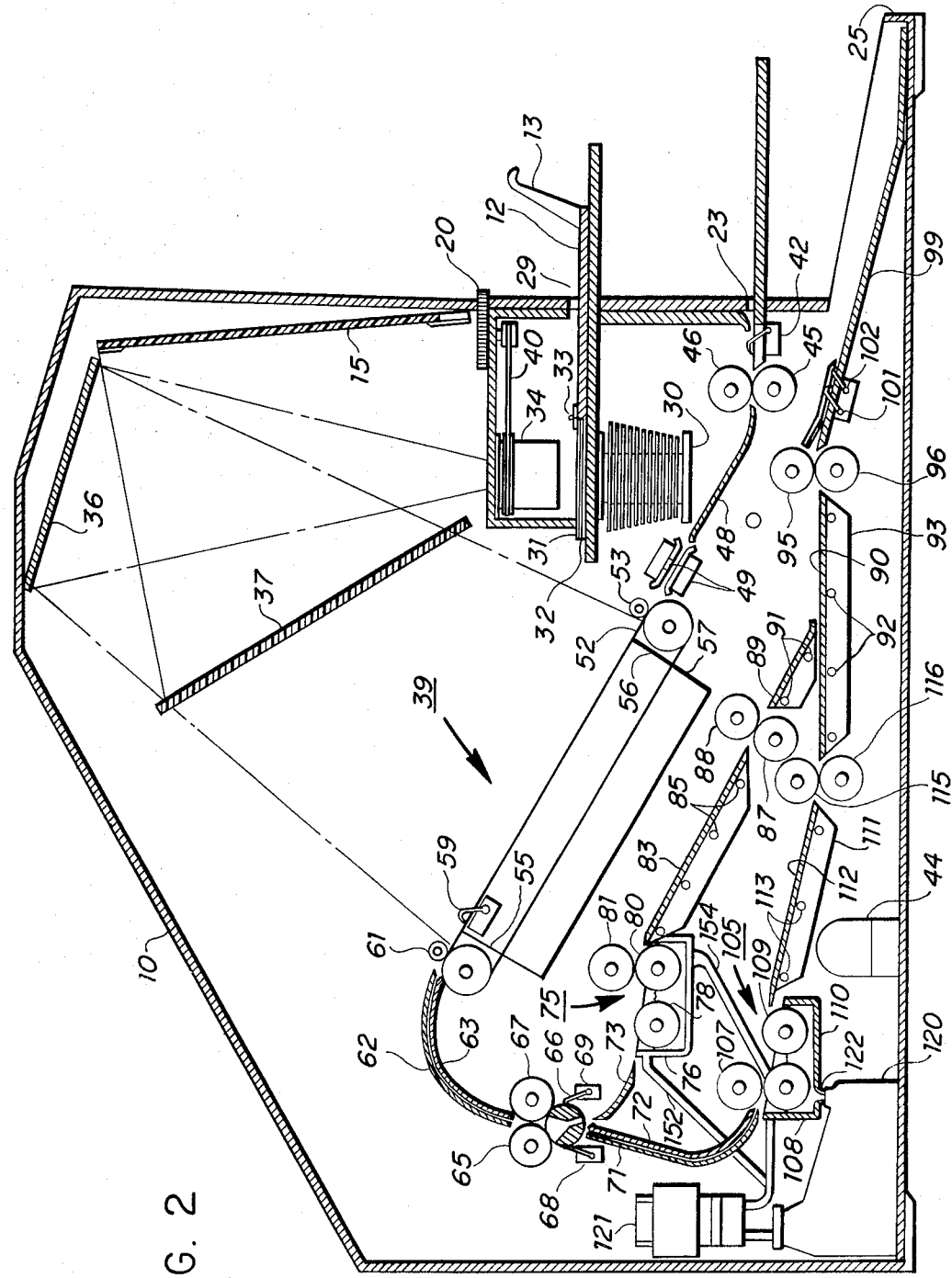
FIG. 2 is a schematic sectional view taken from just inside the left side of the viewer-printer.

The sheet handling and processing apparatus is shown in detail in FIG. 2. FIG. 2 is a vertical section, taken from the left side of the viewer-printer just inside housing 10. The components are shown schematically so that the inventive feature may be clearly discerned. Conventional frame, support and bearing members are omitted, for clarity.

To use the viewer-printer, an operator lifts upper glass plate 31, which pivots about hinge 33, places a microfiche on lower glass plate 32 which is secured to holder 12, then lowers plate 31. Holder 12 is inserted into solt 29 above shelf 22, switch 17 is turned on to activate projection lamp 30.

Light from projection lamp 30 passes upwardly through the microfiche held between glass plates 31 and 32 through projection lens 34 to upper mirror 36 which reflects it downwardly toward beam-splitter 37. Beam-splitter passes part of the light to exposure station 39 and part to viewing screen 15. Any suitable beam-splitter may be used. Preferably, it is of the dichroic type, passing those wavelengths of light to exposure station 39 to which the electrostatic paper is sensitive and passing other wavelengths to screen 15.

While a pivotable totally-reflecting mirror may be used instead of beam-splitter 37, the beam-splitter is preferred since it permits viewing of the image on screen 15 during the copying exposure time, and eliminates problems in always stopping a movable mirror in exactly the same position after every movement. If a totally-reflecting mirror is used, it could be hinged at the top as seen in FIG. 2. During viewing, the mirror 37 would be in the position shown in FIG. 2, and during copying it would be swung toward the back of housing 10, out of the light path between upper mirror 36 and exposure station 39.

Holder 12 is moved around by means of handle 13 until the desired microfiche image is aligned with lens 34 and appears on screen 15. Lens 34 is focused by rotating knob 20, which moves helically mounted lens 34 through a belt and pulley system 40. As the lens mount rotates, the lens elements are moved axially to focus the image appearing on screen 15.

If a hard-copy of the image is desired, a sheet of conventional electrostatic copying paper is inserted in slot 23, coated side up. The leading edge of the sheet trips microswitch 42 which activates drive motor 44 which causes rollers 45 and 46 to rotate (by the chain and sprocket arrangement shown in FIG. 3) pulling the sheet into the viewer-printer. As described in conjunction with FIG. 4, switch 42 acts as a pair of simultaneously operated switches to control two circuits. Simultaneously, switch 42 caused projection lamp 30 to be turned off.

The sheet is fed in along guide member 48 past corona charging unit 49. Corona charger forms an electrostatic charge on the sheet in a conventional manner. Preferably, the upper and lower surfaces are simultaneously charged to equal potentiates of opposite sign.

The sheet then passes between perforated belt 52 and roller 53. Walls 55, 56 within belt 52 and box 57 are provided so that when air is evacuated from box 57 by a conventional vacuum pump (not shown), the resulting pressure difference holds the sheet tightly against belt 52.

As the sheet moves with belt 52, the leading edge eventually trips microswitch 59. This turns the roller and belt drive off, and turns projection lamp 30 on for the time necessary to expose the sheet to the image. During exposure, the image can be viewed on screen 15. A timer actuated by microswitch 59 turns lamp 30 off after the required exposure time and restarts the drive means.

The sheet passes between belt 52 and roller 61, then between guide members 62 and 63. Rollers 65, 67 receive the sheet and pass it through selective guide 66.

Depending upon the position of mode selection switch 18, acting through microswitches 68 and 69 which are sequentially tripped upon rotation of guide 66, the aperture in guide 66 may be selectively aligned with either guide members 71, 72 and guide 73. This selection system is further described below in conjunction with FIG. 4.

As seen in FIG. 2, the aperture in guide 66 may be aligned with guide 73. In this instance, the exposed sheet is moved by driven rollers 65 and 67 into first development station 75.

Development station 75 includes a tank 76 containing a supply of liquid developer. Roller 78 carries a thin layer of the liquid into contact with the exposed sheet surface. The liquid contains toner particles which are attracted to and deposit on image areas (either exposed or unexposed areas, depending upon the characteristics of the developer). For a detailed description of this type of liquid development station, see co-pending U.S. patent application Ser. No. 746,839, now Pat. No. 3,561,400, filed July 23, 1968. Roller 78 may, if desired, have a wire screen surface or may comprise a section of perforated tubing. The developed sheet passes between driven rollers 80 and 81 which pass the sheet onto guide 83. The surface of guide 83 is heated by heating elements 85 within housing 84 to dry the developed sheet. Alternatively, instead of heating elements 85, heated air from the blower producing the vacuum within vacuum box 57 may be ducted so as to impinge on the moistened copy sheet on guide 83.

The sheet then passes between driven rollers 87 and 88, and over guides 89 and 90 heated by heating elements 91 and 92 within housing 93.

Finally, the dried sheet passes between driven rollers 95 and 96, between guides 98 and 99 and into tray 100.

As the leading edge of the sheet reaches the tray, it trips microswitches 101 and 102. Switch 101 closes a parallel drive motor circuit, then switch 102 opens the original drive motor circuit. This keeps drive motor 44 in operation while the sheet passes into tray 100. As the trailing edge of the sheet leaves switch 101, both the original and the parallel drive motor circuits are opened, stopping the drive motor.

If it is desired to produce a hard-copy imaged in the second mode (e.g., positive instead of negative, or in a second color) mode switch 18 is moved to the second position, moving guide 66 so that the aperture aligns with guide members 71 and 72.

Then, the exposed sheet will move toward second development station 105 instead of first development station 75. The sheet passes between driven rollers 107 and 108 and over roller 109 which contact the exposed sheet surface with the developer solution in tank 110. The image is developed in a manner different from station 75 according to the developer characteristics, typically either the sign of the image is opposite or the toner color is different.

The developed sheet then passes over guide 112 which is heated by heating elements 113 within housing 111 to dry the sheet. Further driven rollers 115 and 116 pass the sheet over heated guide 90, then driven rollers 95 and 96 deliver the sheet to tray 25 and the drive means is automatically turned off as described above.

A succession of hard-copies in either of the two modes can rapidly mode in this device.

Developer solution in tank 110 is constantly replenished from a supply tank 120 by means of a pump 121 which operates whenever the drive means is in motion. Excess developer returns to supply tank 120 through drain 122. A similar pump and supply tank, seen in FIG. 3, replenish tank 76.

The drive system for moving the photosensitive sheet through the exposure, selected development and drying stations is schematically illustrated in FIG. 3. This view is of the side of the viewer-printer with the side wall of housing 10 removed. Drive motor 44 drives all of the sheet handling and developing components by means of a single chain or belt indicated by heavy broken line 130 entrained over a series of equal-sized sprockets or pulleys.

Drive pulley 132 on motor 44 rotates in a clockwise direction to move belt 130 in a clockwise direction as seen in FIG. 3. After motor 44, belt 130 passes to an idler pully 133, then to sheet feed pulley 134. Pully drives roller 115 directly, and roller 116 by surface contact with roller 115. After passing idler pulley 136, belt 130 reaches drive pulley 137 which drives rollers 95 and 96 to move an imaged sheet into tray 25.

Belt 130 then drives the sheet input rollers 45 and 46 through pulley 139. The sheet moves between corona charging unit 49 to the nip between roller 53 and belt 52, which is driven by pulley 140.

Drive belt 130 then drives feed rollers 87 and 88 through pulley 143. Next, developer output rollers 80 and 81 are driven through pulley 144 and developing roller 78 is driven by pulley 145, which is mounted on a shaft extending through a seal in the side of tank 76. Belt 130 then drives feed rollers 65 and 66 through pulley 145. Finally, belt 130 drives the alternative developer feed rollers 107 and 108 and development roller 109 through pulleys 146 and 147 before returning to drive motor 44.

This is a very simple and economical drive system, using only a single drive motor. All of the pulleys, and most of the rollers are of a uniform, interchangeable size. All of the rollers preferably have tough elastomeric surfaces and are mounted in suitable bearings (not shown). Tension adjustments to belt 130 are made in a conventional manner by moving idler pulleys 133 and 136 in a transverse direction.

In addition to schematically illustrating the drive system, FIG. 3 also shows the developer replenishment system for the upper development tank 76, which was hidden in FIG. 2. A pump 150 circulates developer solution from supply tank 151 through inlet tube 152 to development tank 76. Excess developer solution drains through tube 154 back to tank 151. Any suitable conventional level control may be used to maintain the desired liquid level within tanks 76 and 110.

A schematic circuit diagram for the electrical control and operating components of the viewer-printer is shown in FIG. 4.

To operate the viewer, the viewer is first connected to a 115 volt power source. Then switch 17 is turned "on" to actuate corona charging unit 49 through high voltage transformer 200, start developer recirculation pump 121 and 150, actuate ready lamp 201, and actuate projection lamp 30 through transformer 203.

After a microfiche has been inserted into the projection system and a frame to be copied has been selected, a sheet of electrostatic paper is inserted into slot, operating microswitch 42. This closes two switches, shown in FIG. 4 as 42a and 42b, energizing relays 205 and 206. This starts drive motor 44 to feed the sheet to the exposure station, starts the vacuum blower motor 207 to draw a vacuum within the enclosure formed by box 57, walls 55 and 56 and belt 52 (as seen in FIG. 1), and shuts off projection lamp 30.

As the sheet moves up along belt 52, held in place by the vacuum, the leading edge finally trips switch 59. Switch 59 energizes relay 208. This stops drive motor 44 and, through delay device 210, turns the projection lamp 30 on. The short delay is intended to prevent the projection lamp coming on before the sheet has stopped moving.

Timer 211 in the projection lamp circuit keeps lamp 30 on for the exposure time set by timer knob 19. When the selected exposure time ends, timer 211 inactivates relay 205 which turns projection lamp 30 off and starts drive motor 44. As the trailing edge of the sheet leaves switch 59, relay 208 is de-energized and the projection lamp 30 is turned on again.

Meanwhile, the operator will have selected which of the two developing stations will be used to develop the latest electrostatic image formed at the exposure station by positioning mode switch 18 in either of two positions. Switch 18 causes a reversible motor 213 rotating selection guide 66 to rotate in either a clockwise or a counterclockwise direction. When guide 66 rotates, an eccentric outer surface actuates either switch 68 or 69, which opens and stops the guide drive motor with the guide slot in alignment with one of the development station guides.

After the sheet leaves the exposure station it passes through the slot in guide 66, passes through the selected development station, over the appropriate heated surface, and finally the sheet leading edge trips switches 101 and 102. As described above, when the trailing edge passes beyond switch 101, relay 206 is re-energized, turning off the drive motor 44 and vacuum blower 207.

Since the projection lamp 30 is again on, the image may be viewed on screen 15 and further images selected for copying.

While various specific components and arrangements have been described in the above description of a preferred embodiment, other suitable arrangements or components may be used, where suitable, with similar results.

Other variations and modifications of the present invention will occur to those skilled in the art upon reading this disclosure. These are intended to be included within the scope of the invention, as defined in the appended claims.

We claim:

1. A microfilm viewer-printer comprising a housing containing:
   (a) a light source;
   (b) a film supporting station adjacent to said light source;
   (c) an optical system including beam-splitting means to direct a first portion of the light from said light source passing through said film supporting station to a projection screen for viewing the film image and means to direct a second portion of said light to an explosive station for copying said film image;
   (d) means to move a sheet of photo-sensitive material into said exposure station;
   (e) means to expose said sheet at said exposure station to said image to form a latent image on said sheet while permitting simultaneous viewing of said image on said screen;
   (f) two independent image development stations, one capable of producing a positive visible image on said sheet corresponding to said latent image and the other capable of producing a negative visible image on said sheet corresponding to said latent image;
   (g) movable guide means to selectively direct said sheet from said exposure station through either of said development stations, said guide means including a slotted member through which said sheet is directed after leaving said exposure station, said slotted member being movable so as to align the output end of said slot with input paths to either of said development stations, while the input end of said slot remains aligned with a single output guide from said exposure station; and (h) means to move the developed sheet from said exposure station, through said guide means and selected development station to an output tray outside said housing.

2. The microfilm viewer-printer according to claim 1 including means to deactivate said light source while said photosensitive sheet is moving into said exposure station, means to reactivate said light source to expose said sheet, means to then deactivate said light source while said sheet is moved out of said exposure station and means to finally reactivate said light source, whereby an image appears on said screen at all times except when said sheet is moving at the exposure station.

3. The microfilm view-printer according to claim 1 wherein said exposure station includes means to form an electrostatic charge pattern on said sheet and each of said two development stations includes means for applying a liquid toner suspension to the latent electrostatic image to form a visible image thereon.

4. The microfilm viewer-printer according to claim 3 wherein one of said two development stations is adapted to form a visible image in those areas on said sheet which bear an appreciable electrostatic charge and the second of which is adapted to form a visible image in those areas on said sheet which bear a substantially lower electrostatic charge.

5. The microfilm viewer-printer according to claim 4 wherein said exposure station includes electrostatic charging means for substantially uniformly charging a photoconductive sheet before exposure.

References Cited
UNITED STATES PATENTS

| | | | |
|---|---|---|---|
| 2,600,168 | 6/1952 | Klyce | 95—4.5 |
| 3,010,842 | 11/1961 | Ricker | 117—37 LE |
| 3,547,534 | 12/1970 | Akiyama et al. | 355—45 X |
| 3,536,399 | 10/1970 | Herman | 395—10 X |
| 3,332,331 | 7/1967 | Mandler | 95—42 |

SAMUEL S. MATTHEWS, Primary Examiner

R. L. MOSES, Assistant Examiner

U.S. Cl. X.R.

355—10, 45